Patented Dec. 15, 1936

2,064,783

UNITED STATES PATENT OFFICE 2,064,783

THIAZYL DERIVATIVES

Howard I. Cramer, Cuyahoga Falls, Ohio, assignor to Wingfoot Corporation, Wilmington, Del., a corporation of Delaware No Drawing. Application April 11, 1934, Serial No. 720,100

10 Claims. (Cl. 260—44)

This invention relates to a new and useful class of chemical compounds and to a method of preparing them. More particularly, it concerns a class of materials which may be termed thiazyl esters of dithiocarbamic acids derived from secondary amines containing a furane ring. Although these compounds may perhaps be prepared by other methods as well, they are preferably formed by reacting a suitable salt of a secondary furfuryl dithiocarbamic acid with a halogen aryl thiazole. While the compounds of the invention may be used for any purpose for which they are suited, it has been found that they are in general good accelerators of rubber vulcanization.

Although any halogen aryl thiazole may be employed, it has been found that the 1-chlor aryl thiazoles are particularly well adapted for the purposes of the invention. Of the 1-chlor aryl thiazoles, 1-chlor 5-nitro benzothiazole in particular has been found to give rise to products which are excellent accelerators of the vulcanization of rubber. It will, of course, be understood that other halogen aryl thiazoles may be employed in the practice of the invention, examples being 1-chlor 5-methoxy benzothiazole, 1-chlor benzothiazole, 1-chlor tolyl thiazole, 1-chlor 4-nitro benzothiazole, 1-chlor 5-ethoxy benzothiazole, 1-chlor 5-methyl benzothiazole, 1-chlor dimethyl benzothiazoles, 1-chlor 4- or 5-chlor benzothiazole, 1-chlor 3-phenyl benzothiazole, 1-chlor naphtho thiazoles and their nitro derivatives, 1-chlor 4-chlor 5-nitro benzothiazole and 1-chlor 3-methyl 5-nitro benzothiazole. These halogen aryl thiazoles may conveniently be prepared by the process disclosed in United States Patent No. 1,757,930.

The dithiocarbamates used in this process may be represented by the formula

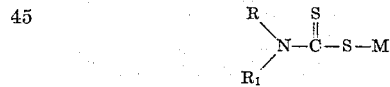

wherein R represents a radical containing a furane ring such as furfuryl; $R_1$ is any monovalent organic radical, furfuryl, alicyclic, aralkyl and alkyl radicals being typical; and M is any reactive metallic radical or equivalent group, such as sodium, potassium or ammonium, which does not seriously impair the solubility of the dithiocarbamate in the solvent employed in effecting the desired reaction.

Illustrative of salts of dithiocarbamate which may be employed in the invention are potassium di(alpha furfuryl) dithiocarbamate, sodium di(alpha furfuryl) dithiocarbamate, ammonium N-cyclohexyl alpha furfuryl dithiocarbamate, sodium N-ethyl alpha furfuryl dithiocarbamate, sodium benzyl alpha furfuryl dithiocarbamate, potassium ethyl furfuryl dithiocarbamate, sodium methyl alpha furfuryl dithiocarbamate, potassium phenyl furfuryl dithiocarbamate, sodium isobutyl alpha furfuryl dithiocarbamate, ammonium n-propyl furfuryl dithiocarbamate, ammonium isoamyl furfuryl dithiocarbamate, sodium furfuryl benzyl dithiocarbamate, ammonium n-butyl furfuryl dithiocarbamate, sodium deca hydro naphthyl furfuryl dithiocarbamate, sodium beta phenyl ethylene furfuryl dithiocarbamate and potassium hexahydro tolyl furfuryl dithiocarbamate.

The desired halogen aryl thiazole may be caused to react with any secondary furfuryl dithiocarbamate to produce the corresponding reaction product. Although it is not known to be true in all cases, it is believed that the reaction proceeds according to the following general equation:

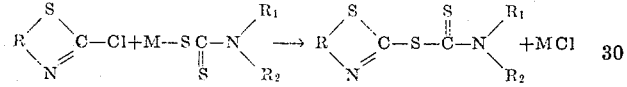

In certain cases other reactions may take place to the extent of perhaps 30%, yielding products which may or may not be separated, as desired, from the main product. If desired, the total composite product may be employed as such, as for example, as an accelerator of rubber vulcanization.

The reaction product of 1-chlor 5-nitro benzothiazole and the sodium salt of di(alpha furfuryl) dithiocarbamate is an example of a compound falling within the scope of the invention. It may be prepared by refluxing 1-chlor 5-nitro benzothiazole, di alpha furfuryl amine, carbon bisulphide and an alkali such as sodium hydroxide in a solvent such as ethyl alcohol. After a period of from one half hour to four hours the reaction product precipitates as a crystalline material which may be washed with water to remove the sodium chloride formed during the reaction. The crystalline material, 5-nitro benzothiazyl 1-di(alpha furfuryl) dithiocarbamate, upon being further purified by crystallizing from alcohol, precipitates in the form of brown crystals having a melting point of 93–95 degrees C. The product upon analysis is found to contain 9.94% nitrogen and 21.63% sulphur as compared with the theoretical percentages for 5-nitro benzothiazyl 1-di(alpha furfuryl) dithiocarbamate of 9.74% nitrogen and 22.30% sulphur. The equation representing the reaction is probably as follows:

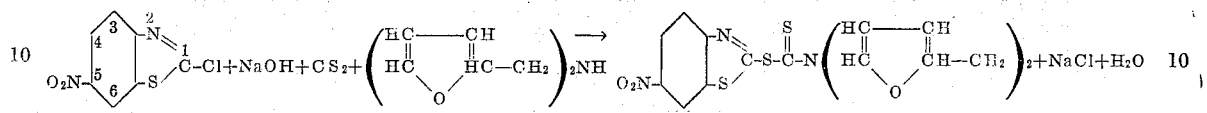

It will be understood that the dithiocarbamate derived from a secondary amine containing at least one furane ring may be formed in situ in contact with the halogen aryl thiazole.

It is believed that by the practice of the invention any aryl thiazyl ester of a dithiocarbamic acid derived from a secondary amine containing at least one furane ring may be prepared without regard to the nature of the substituents in the aryl ring or to their position therein. However, the halogen nitro benzothiazoles have been found to be capable of being employed in the invention somewhat more conveniently than certain of the other thiazoles, the presence of the nitro group apparently facilitating the reaction. It will be understood that the brom aryl thiazoles and other halogen aryl thiazoles may be substituted for the chlor benzo thiazoles. Similarly, the halogen naphthothiazoles may be substituted for the halogen benzothiazoles.

Conveniently any of these new accelerators or a mixture thereof may be added to any of the ordinary rubber mixes in an amount which may be determined according to the usual methods. It has been found for example that the compounds of the present invention are excellent delayed action accelerators in a rubber composition of the following formula:

| | Parts by weight |
|---|---|
| Extracted pale crepe | 100 |
| Zinc oxide | 5 |
| Sulphur | 3 |
| Stearic acid | 1.5 |
| Accelerator | 0.5 |

Samples of the compounded rubber made up in accordance with this formula were subjected to vulcanization by steam heat in a mold after which they were subjected to physical tests to ascertain their elasticity and tensile strength.

The results of these tests are given in the following table:

| Cure in mins. °F. | Ult. tensile in kgs/cm² | Max. elong. in percent | Modulus in kgs/cm² | |
|---|---|---|---|---|
| | | | 500% | 700% |
| 5-nitro benzothiazyl 1-di (alpha furfuryl) dithiocarbamate | | | | |
| 15/260 | No cure | | | |
| 20 | 128 | 775 | 22 | 80 |
| 30 | 146 | 760 | 36 | 148 |
| 40 | 160 | 715 | 24 | 135 |
| 60 | 146 | 760 | 29 | 100 |

It will be apparent from the preceding tables that the use of these compounds results in excellent cures at comparatively low temperatures, the vulcanized products having excellent physical qualities both in regard to tensile strength and elongation. It is also apparent from the preceding data that these accelerators have excellent delayed action properties, making them particularly desirable in rubber stocks which frequently cause trouble from scorching or prevulcanization.

It will be understood that by the term "rubber" is meant any of the ordinary forms of rubber such as latex, balata, gutta percha, reclaimed rubber, and the ordinary coagulated forms of the *Hevea brasiliensis* tree. It is intended that the patent shall cover, by suitable expression in the appended claims, whatever features of patentable novelty reside in the invention.

What I claim is:

1. An arylene thiazyl ester of a dithiocarbamic acid in which the nitrogen atom of the dithiocarbamic acid group is substituted by a furfuryl radical, said arylene being a member of the benzene and naphthalene series.

2. A nitro arylene thiazyl ester of a furfuryl dithiocarbamic acid prepared from a secondary furfuryl amine, said arylene being a member of the benzene and naphthalene series.

3. A nitro benzothiazyl ester of a furfuryl dithiocarbamic acid prepared from a secondary furfuryl amine.

4. A compound having the formula

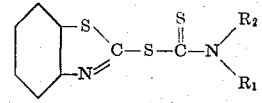

wherein $R_1$ is a furfuryl radical and $R_2$ is hydrocarbon.

5. A compound having the formula

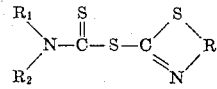

wherein R is an ortho arylene group of the benzene and naphthalene series, $R_1$ is a furfuryl radical and $R_2$ is an aliphatic hydrocarbon radical.

6. The 5-nitro benzothiazole ester of a difurfuryl dithiocarbamic acid.

7. A benzothiazyl ester of a furfuryl dithiocarbamic acid prepared from a secondary furfuryl amine.

8. A nitro benzothiazyl ester of di alpha furfuryl dithiocarbamic acid.

9. 5-nitro benzothiazyl 1-di (alpha furfuryl) dithiocarbamate.

10. An arylene thiazyl ester of a furfuryl dithiocarbamic acid prepared from a secondary furfuryl amine, said arylene being a member of the benzene and naphthalene series.

HOWARD I. CRAMER.